(12) United States Patent
Matsuoka (10) Patent No.: US 8,045,230 B2
(45) Date of Patent: Oct. 25, 2011

(54) IMAGE PROCESSING APPARATUS, METHOD, COMPUTER PROGRAM PRODUCT, AND IMAGE FORMING APPARATUS, DETECTING A HALFTONE AREA BASED ON A REARRANGED HALFTONE DOT DETECTION RESULT

(75) Inventor: Taira Matsuoka, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 538 days.

(21) Appl. No.: 12/274,680

(22) Filed: Nov. 20, 2008

(65) Prior Publication Data

US 2009/0141310 A1    Jun. 4, 2009

(30) Foreign Application Priority Data

Nov. 30, 2007  (JP) ................................. 2007-311036

(51) Int. Cl.
*H04N 1/403* (2006.01)
(52) U.S. Cl. .................... 358/2.1; 358/3.06; 358/462
(58) Field of Classification Search ............. 358/1.9, 358/2.1, 3.06, 462; 382/173, 176
See application file for complete search history.

(56) References Cited

U.S. PATENT DOCUMENTS

| | | | | |
|---|---|---|---|---|
| 5,946,452 A | * | 8/1999 | Spaulding et al. | 358/1.9 |
| 6,661,535 B1 | * | 12/2003 | Fujimura et al. | 358/3.02 |
| 7,136,194 B2 | * | 11/2006 | Akahori et al. | 358/2.1 |
| 7,518,755 B2 | * | 4/2009 | Gotoh et al. | 358/3.06 |
| 2010/0092092 A1 | * | 4/2010 | Sakaue | 382/200 |

FOREIGN PATENT DOCUMENTS

| | | |
|---|---|---|
| JP | 2002-290719 | 10/2002 |
| JP | 3983101 | 7/2007 |

\* cited by examiner

*Primary Examiner* — Scott A Rogers
(74) *Attorney, Agent, or Firm* — Oblon, Spivak, McClelland, Maier & Neustadt, L.L.P.

(57) ABSTRACT

A halftone pixel detection unit detects pixels near center pixels of halftone pixels by comparing a density difference between a target pixel and each of neighboring pixels of image data with a predetermined threshold. A halftone pixel rearranging unit rearranges the halftone pixels detected by the halftone pixel detection unit relative to the target pixel and a halftone-area detection unit detects a halftone area based upon a pattern of the halftone pixels that is rearranged.

10 Claims, 7 Drawing Sheets

| T1 | T2 | T3 |
| --- | --- | --- |
| T4 | T5 | T6 |
| T7 | T8 | T9 |

FIG. 11

IMAGE PROCESSING APPARATUS, METHOD, COMPUTER PROGRAM PRODUCT, AND IMAGE FORMING APPARATUS, DETECTING A HALFTONE AREA BASED ON A REARRANGED HALFTONE DOT DETECTION RESULT

CROSS-REFERENCE TO RELATED APPLICATIONS

The present application claims priority to and incorporates by reference the entire contents of Japanese priority document 2007-311036 filed in Japan on Nov. 30, 2007.

BACKGROUND OF THE INVENTION

1. Field of the Invention

The present invention relates to an image processing apparatus, an image processing method, and a computer program product.

2. Description of the Related Art

Image processing apparatuses that digitalize image data acquired with a scanner by scanning an original are known in the art. Some of such image processing apparatuses include a halftone detection unit that extracts halftone detection area, which can have various sizes, from the digital image data and then decide whether a target pixel, which is a target of processing, is inside any of those halftone areas. Such an image processing apparatus has been disclosed in, for example, Japanese Patent Application Laid-open No. 2003-46772. Because such image processing apparatuses employ a plurality of pixels of various sizes, they can detect halftone areas containing various number of lines ranging from low number of screen lines of about 65 lines per inch to high number of screen lines of about 200 lines per inch. Especially, for halftone dots that contain low number of screen lines; i.e., 100 or less lines per inch, a cycle of pixels included therein is larger, so that a halftone detection filter that is larger in size than that needed for detecting halftone dots that contain high number of screen lines. Thus, the image processing apparatus disclosed in Japanese Patent Application Laid-open No. 2003-46772 is suitable for detecting halftone dots that contain only low number of screen lines.

Complicated small characters, such as kanji characters, in digital image data can have areas where density-difference pattern are partially similar to that of a reference halftone pattern. Pixels in such an area are often erroneously detected as belonging to a halftone dot. Generally, not all the pixels that are detected as belonging to a halftone dot belong to a true halftone area. Pixels belonging to a halftone dot in a true halftone area are characterized in that they are present in high density and are lined up in a regular pattern. On the other hand, the pixels in the areas where density-difference pattern are partially similar to that of a reference halftone pattern are relatively scattered and are not lined up in a regular pattern. However, if a situation occurs where the pixels in the areas where density-difference pattern are partially similar to that of a reference halftone pattern show the same characteristics as the pixels belonging to a halftone dot in a true halftone area, it can lead to erroneous determination.

SUMMARY OF THE INVENTION

It is an object of the present invention to at least partially solve the problems in the conventional technology.

According to an aspect of the present invention, there is provided an image processing apparatus including a receiving unit that receives image data; a halftone-dot pixel detection unit that, for each pixel in the image data, detects halftone-dot pixels of a halftone dot as a halftone dot detection result by comparing a density difference between a target pixel and a neighboring pixel group with a predetermined threshold; a halftone-dot pixel rearranging unit that rearranges the halftone dot detection result near the target pixel; and a halftone-area detection unit that detects a halftone area based on the halftone dot detection result rearranged by the halftone-dot pixel rearranging unit.

According to another aspect of the present invention, there is provided an image forming apparatus including the above image processing apparatus and an image forming device that forms an image based on image data in which halftone pixel areas are detected by the image processing apparatus and prints the image onto a paper.

According to still another aspect of the present invention, there is provided an image processing method including receiving image data; detecting, for each pixel in the image data, halftone-dot pixels of a halftone dot as a halftone dot detection result by comparing a density difference between a target pixel and a neighboring pixel group with a predetermined threshold; rearranging the halftone dot detection result near the target pixel; and detecting a halftone area based on the halftone dot detection result rearranged at the rearranging.

According to still another aspect of the present invention, there is provided a computer program product that includes a computer program stored on a computer-readable recording medium which when executed on a computer causes the computer to execute the above image processing method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The embodiments are explained by assuming that an image processing apparatus according to the present invention is used in a digital full-color image forming apparatus (hereinafter, "copier"); however the image processing apparatus can be used in a device other than the copier. The image processing apparatus can be used, for example, in an image forming apparatus such as a multifunction product (MFP) including a printer function, a copier function, a scanner function, and a facsimile function, a scanner, and a facsimile. The information processing apparatus can be used, for example, in a general computer.

Figure 1:
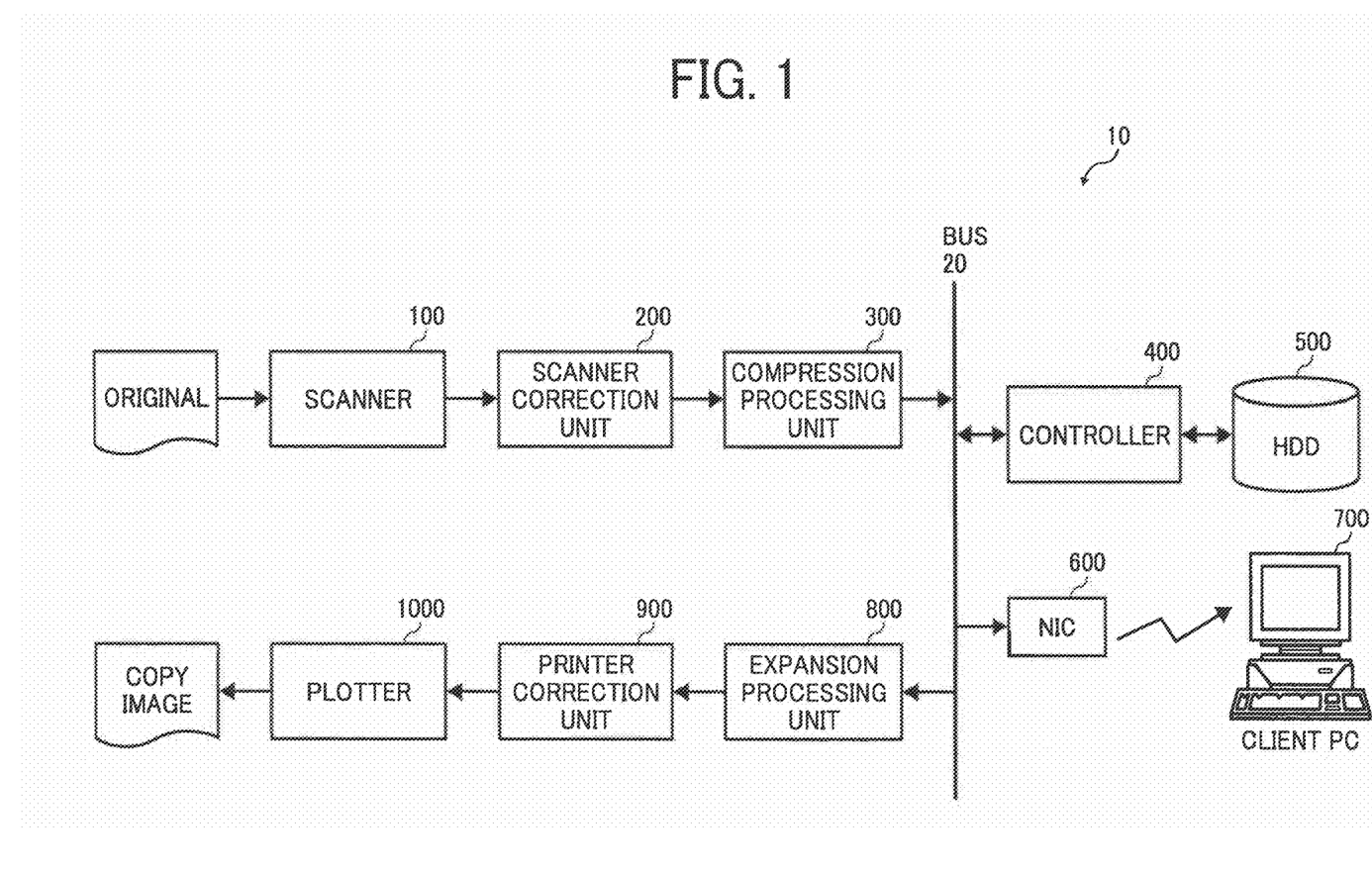
FIG. 1 is a block diagram of a copier according to a first embodiment of the present invention.

FIG. 1 is a block diagram of a copier 10 according to a first embodiment of the present invention. The copier 10 includes a scanner 100, a scanner correction unit 200, a compression processing unit 300, a controller 400, a network interface controller (NIC) 600, an expansion processing unit 800, a printer correction unit 900, a hard disk (HDD) 500 that stores therein image data, a plotter 1000 that outputs (plots, writes) image data, and a bus 20, all of which are connected to a client personal computer (PC) 700.

The scanner 100 includes a line sensor including a charge coupled device (CCD) photoelectric conversion element, an analog/digital (A/D) converter, and a drive circuit that drives the line sensor and the A/C converter (all are not shown). The scanner 100 scans an original to acquire color contrasting density information of the original and generates digital image data based on acquired signal. Specifically, the scanner 100 acquires red (R), green (G), and blue (B) analog signals for each pixel from the original, converts those analog signals into RGB digital image data, and outputs the RGB digital image data to the scanner correction unit 200.

The scanner correction unit 200 receives the RGB digital image data from the scanner 100 and performs correction processing on the digital image data so as to correct attributes of the scanner 100. For example, the scanner correction unit 200 performs γ correction processing to conform brightness of the digital image data to predetermined characteristics, image area separation processing to separate an image area into a character area, a line area, a picture area, and the like, and filtering processing to emphasize character areas and smooth picture areas. Details of the processing performed by the scanner correction unit 200 are later explained.

The compression processing unit 300 performs compression processing on the image data that has been corrected by the scanner correction unit 200, and sends the compressed image data to the controller 400 via the bus 20. A lossless compression method is preferably used in the compression processing unit 300 when performing the compression processing. Alternatively, the image data can be output in an uncompressed state if the bandwidth of the bus 20 is sufficiently wide and the HDD 500 has a sufficient storage capacity.

The controller 400 communicates with and controls all the units in the copier 10. Furthermore, the controller 400 controls input of data from an operation unit (not shown). The controller 400 temporarily stores the received image data in a semiconductor memory (not shown) and then transfers the image data into the HDD 500 at an appropriate timing as required. When the image data is stored into the HDD 500, even when a paper sheet on which an image corresponding to the image data has been printed is not discharged properly due to paper jamming etc., the image corresponding to the image data can be printed on another paper sheet without re-scanning the original. Moreover, it is possible to perform electronic sorting for sorting a number of image data, and reoutput or redistribute the image data as required. As necessary, the controller 400 sends the image data stored in the HDD 500 to the expansion processing unit 800 via the bus 20.

The expansion processing unit 800 expands the compressed image data to the original multivalued image and sends the multivalued image to the printer correction unit 900.

The printer correction unit 900 performs γ correction processing, gradation processing, correction processing of plotter-attributable brightness properties, and quantization of image data by random dither processing or dither processing in accordance with the gradation characteristics of the plotter 1000 and the image area separation result.

Upon reception of the digital image data for four colors of cyan (C), magenta (M), yellow (Y), and black (K), the plotter 1000 causes toner to adhere to latent images on photosensitive elements (not shown) formed by a laser light to form toner images, transfers the toner images onto a printing sheet with heat and pressure, thereby reproducing an image corresponding to the image data.

The client PC 700 serves as a user interface (I/F) with the copier 10. The client PC 700 includes a display and input units such as a keyboard, a pointing device, and the like (all are not shown). The NIC 600 is an expansion card that constitutes a local area network (LAN). Thus, the image data can be transmitted to the client PC 700 via the bus 20 and the NIC 600.

When the scanner 100 is used to distribute image data to, for example, an external client PC on network, the scanner 100 generates image data from the scanned original similarly to the case where it is used as a digital full color copier. The generated image data is sent to the controller 400 through the scanner correction unit 200 and the compression processing unit 300. The controller 400 performs format processing on the image data and transmits the formatted image data to the client PC 700 through the NIC 600. The controller 400 performs general image format conversion into, for example, Joint Photographic Experts Group (JPEG), Tagged Image File Format (TIFF), and bitmap (BMP).

Figure 2:
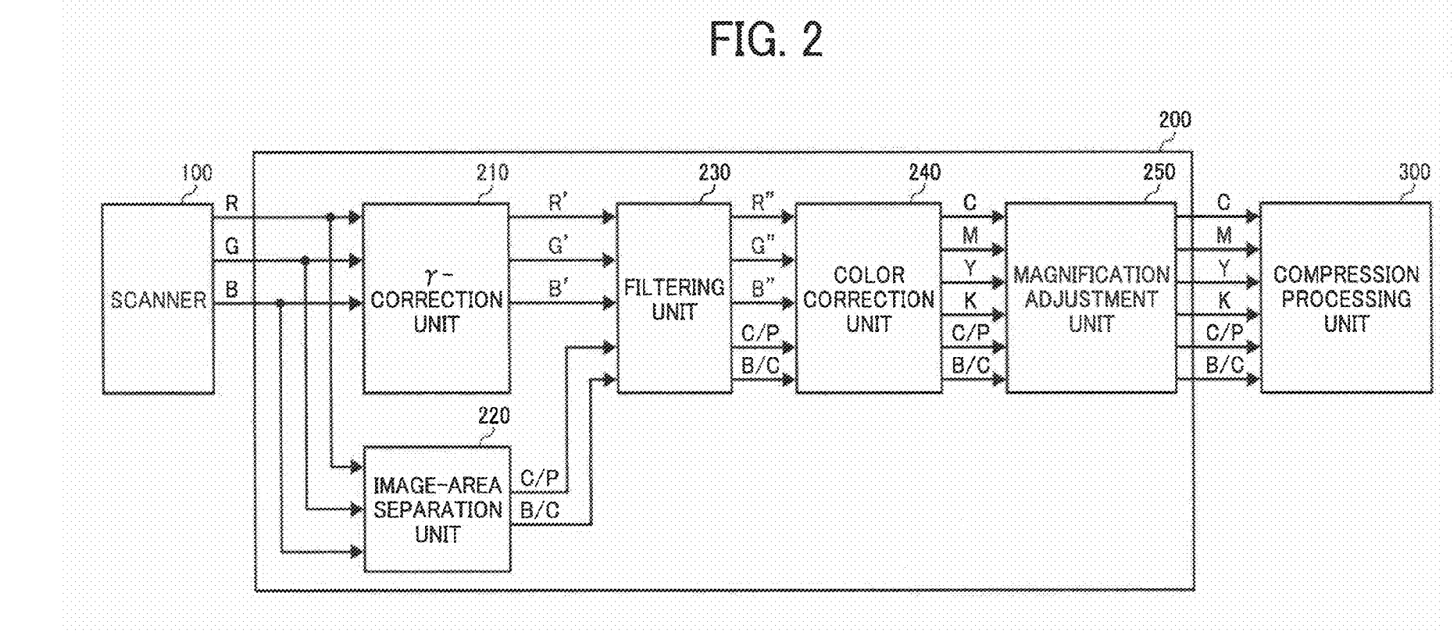
FIG. 2 is a detailed block diagram of a scanner correction unit shown in FIG. 1.

FIG. 2 is a detailed block diagram of the scanner correction unit 200. The scanner correction unit 200 includes a γ-correction unit 210, an image-area separation unit 220, a filtering unit 230, a color correction unit 240, and a magnification adjustment unit 250.

The γ-correction unit 210 converts the RGB digital image data into digital values proportional to the brightness level (R'G'B') for each color of red, green, and blue. On the other hand, the image-area separation unit 220 separates the RGB digital image data into those corresponding to character areas, halftone areas, picture areas, or the like in the image of the original, and outputs the result as a separation signal such as a C/P signal and a B/C signal. Based on the C/P signal indicative of the result of the determination of "character area/non-character area", "halftone area/non-halftone area", and the like, the filtering unit 230 performs filtering processing, such as emphasizing the character area and smoothing the halftone area, on the R'G'B' digital image data. The color correction unit 240 converts the filtered R'G'B' digital image data into color image data including recording color information of cyan, magenta, yellow, and black (CMYK) that is different from the RGB color space. The magnification adjustment unit 250 enlarges or reduces the size of the color consolidated CMYK digital image data in a main scanning direction to be output.

Figure 3:
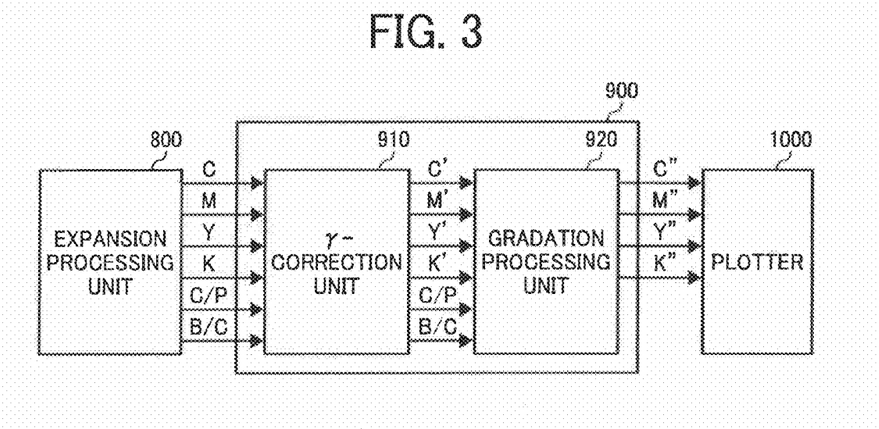
FIG. 3 is a detailed block diagram of a printer correction unit shown in FIG. 1.

FIG. 3 is a detailed block diagram of the printer correction unit 900. The printer correction unit 900 includes a γ-correction unit 910 and a gradation processing unit 920.

The γ-correction unit 910 performs γ-correction processing on the CMYK digital image data that has been output from the expansion processing unit 800 according to frequency characteristic of the plotter 1000 thereby generating C'M'Y'K' digital image data. The γ-correction unit 910 performs γ-correction processing of contrast-adding for an area for which the result of the determination by the image-area separation unit 220 indicates a character area, and performs γ-correction processing to emphasize reproduction of graduation for an area for which the result of the determination indicates a picture area.

The gradation processing unit 920 quantizes the C'M'Y'K' digital image data by such as dither processing and random dither processing thereby generating C"M"Y"K" digital image data. Specifically, the gradation processing unit 920 performs midtone sharpening of emphasizing character sharpness for an area for which the result of the determination by the image-area separation unit 220 indicates a character area and midtone sharpening of emphasizing smoothness of an image for an area for which the result of the determination by the image-area separation unit 220 indicates a picture area. Then, the gradation processing unit 920 sends the C"M"Y"K" digital imaged data to the plotter 1000. The plotter 1000 forms an image based on the C"M"Y"K" digital imaged data and outputs the image onto a paper sheet.

Figure 4:
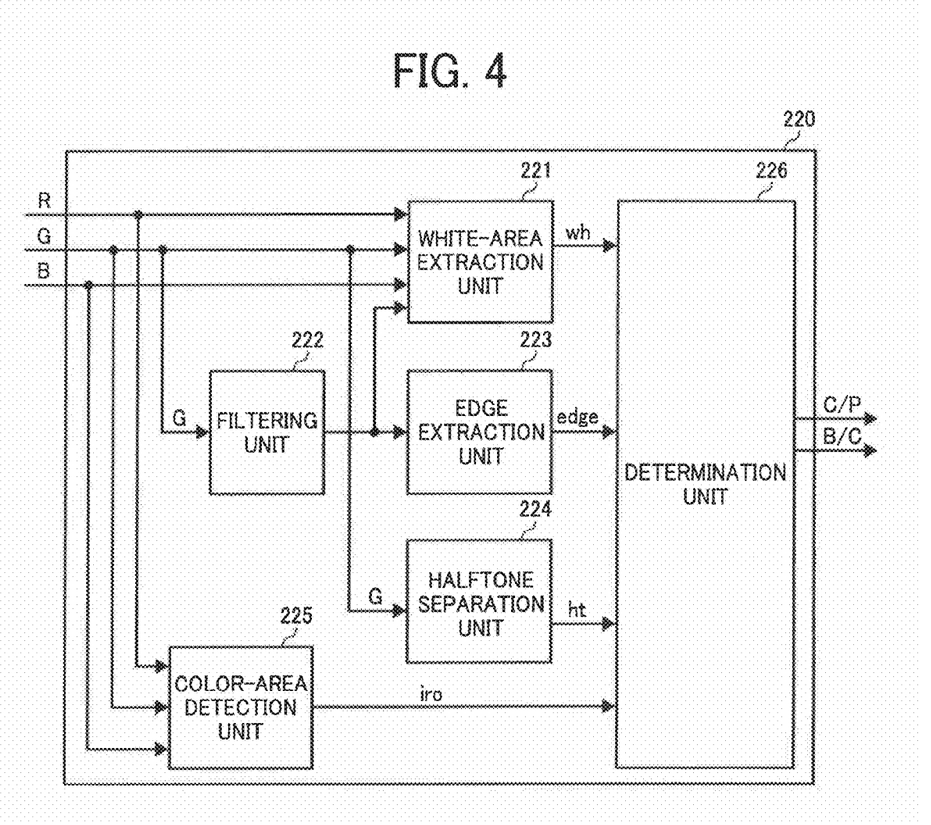
FIG. 4 is a detailed block diagram of an image-area separation unit shown in FIG. 2.

FIG. 4 is a detailed block diagram of the image-area separation unit 220. The image-area separation unit 220 includes a white-area extraction unit 221, a filtering unit 222, an edge extraction unit 223, a halftone separation unit 224, a color-area detection unit 225, and a determination unit 226. The function and configuration of all the units in the image-area separation unit 220 except the halftone separation unit 224 are, the same as those disclosed in Japanese Patent Application Laid-open No. 2003-46772. However, function and configuration of all or some of the units in the image-area separation unit 220 can be changed as appropriate. In the present embodiment, a scan density of 600 dots per inch (dpi) is used for an explanation; however, some other scan density can be used.

The white-area extraction unit 221 extracts a white area from the image data. For example, the white-area extraction unit 221 outputs a binary signal of wh=1 when a target pixel is determined as a white pixel, and outputs a binary signal of wh=0 when a target pixel is determined as a non-white pixel. The details of the processing performed by the white-area extraction unit 221 are similar to those disclosed in paragraphs of 0084 to 0126 of Japanese Patent Application Laid-open No. 2003-46772. However, the processing performed by the white-area extraction unit 221 can be changed as appropriate.

A character area typically includes a number of high density pixels (hereinafter, "black pixels") and a number of low density pixels (hereinafter, "white pixels"), and the black pixels and white pixels are continuously arranged in edge portions.

The filtering unit 222 corrects green image data generated by the scanner 100 to extract edges of characters. By emphasizing the edges, the green image data of which degraded modulation transfer function (MTF) characteristics have been corrected is output. The details of the processing performed by the filtering unit 222 are similar to those disclosed in paragraphs of 0069 to 0077 of Japanese Patent Application Laid-open No. 2003-46772. However, the processing performed by the filtering unit 222 can be changed as appropriate.

The edge extraction unit 223 detects edges of characters based on a continuous pattern for each of black pixels and white pixels in the edge portions in the character area, and outputs a result as an edge signal. The processing details by the edge extraction unit 223 are similar to those disclosed in paragraphs of 0078 to 0083 of Japanese Patent Application Laid-open No. 2003-46772. However, the processing performed by the edge extraction unit 223 can be changed as appropriate.

The color-area detection unit 225 detects a colored area from image data. Depending on image data samplings of each color of red, green, and blue, or mechanical accuracy, scanning shift may occur among red, green, and blue images when detecting the colored pixels and the black (non-colored) pixel of the image data. Specifically, when the target pixel is determined as a colored pixel, a binary signal of iro=1 is output, and when the target pixel is determined as a non-colored pixel, a binary signal of iro=0 is output. The details of the processing details by the color-area detection unit 225 are similar to those by the color-area detection unit disclosed in paragraphs of 0158 to 0205 of Japanese Patent Application Laid-open No. 2003-46772. However, the processing performed by the color-area detection unit 225 can be changed as appropriate.

The determination unit 226 outputs a 2-bit C/P signal and a 1-bit B/C signal based on the results received from the white-area extraction unit 221, the edge extraction unit 223, the halftone separation unit 224, and the color-area detection unit 225. The detail of the C/P signal is explained below.

| CHARACTER | HALFTONE | C/P SIGNAL | CLASSIFICATION |
|---|---|---|---|
| 0 | 0 | 0 | picture |
| 1 | 0 | 1 | character |
| 1 | 1 | 2 | halftone |

When C/P=0, the image area is a picture area; when C/P=1, the image area is a character area; and when C/P=2, the image area is a halftone area. Furthermore, when B/C=0, the image area is a non-colored area; and when B/C=1, the image area is a colored area. The condition for determining as a character is an edge extraction=1, a halftone extraction=0, and a white area extraction=1. The C/P signal and the B/C signal are synchronized with the color-separated RGB image data or CMYK image data, and are input into each processing unit of the scanner correction unit 200. The signals are referred to as necessary. The C/P signal and the B/C signal are compressed and expanded together with the image data to be input into the printer correction unit 900. The signals are referred to in each processing unit of the printer correction unit 900 as necessary.

Figure 5:
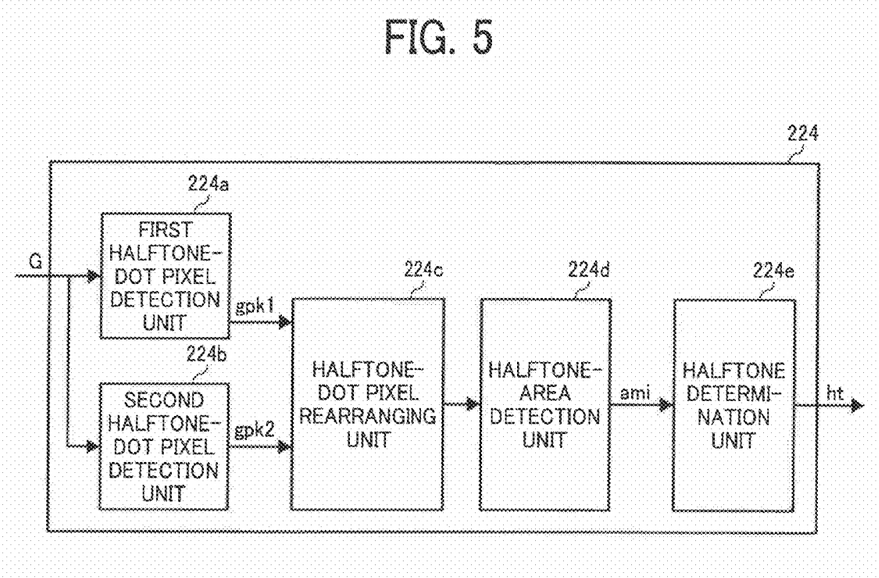
FIG. 5 is a detailed block diagram of a halftone separation unit shown in FIG. 4.

FIG. 5 is a detailed block diagram of the halftone separation unit 224. The halftone separation unit 224 includes a first halftone-dot pixel detection unit 224a, a second halftone-dot pixel detection unit 224b, a halftone-dot pixel rearranging unit 224c, a halftone-area detection unit 224d, and a halftone determination unit 224e.

Each of the first halftone-dot pixel detection unit 224a and the second halftone-dot pixel detection unit 224b detects pixels (halftone-dot pixels) that belong to a halftone dot based on the pixel density information in two-dimensional local patch of a predetermined size by using the input green image data. For example, when an absolute value of the density difference between a target pixel and a group of neighboring pixels is greater than a predetermined threshold, each of the first halftone-dot pixel detection unit 224a and the second halftone-dot pixel detection unit 224b decide that the target pixel is a halftone-dot pixel and outputs a binary signal of gpk1=1 or gpk2=1. Otherwise, each of the first halftone-dot pixel detection unit 224a and the second halftone-dot pixel detection unit 224b outputs a binary signal of gpk1=0 or gpk2=0. The two dimensional patch viewed by the first halftone-dot pixel detection unit 224a is 5×5 and by the second halftone-dot pixel detection unit 224b is 7×7. The details of the processing performed by the first halftone-dot pixel detection unit 224a and the second halftone-dot pixel detection unit 224b are similar to those by the first halftone peak detection unit and the third halftone peak detection unit disclosed respectively in paragraphs 0135 to 0143, and 0146 to 0154 of Japanese Patent Application Laid-open No. 2003-46772. However, the processing performed by the first halftone-dot pixel detection unit 224a and the second halftone-dot pixel detection unit 224b can be changed as appropriate.

The halftone-dot pixel rearranging unit 224c rearranges the halftone-dot pixels of the result of the detection (hereinafter, "halftone-dot pixel detection result") as the binary signals gpk1 and gpk2 onto near the target pixels, and outputs the rearranged halftone-dot pixel detection result. The detail of the processing performed by the halftone-dot pixel rearranging unit 224c is explained below.

Halftone areas that contain relatively low number of screen lines of equal to or lower than 100 lines per inch are detected by using the 7×7 detection window, and halftone areas that contain relatively high number of screen lines of higher than 100 lines per inch are detected by using the 5×5 detection window. In practice, only a 3×3 area in the 5×5 detection window is viewed for detecting halftone areas at high number of screen lines between about 150 to about 200 lines per inch. Then, an entire area of the 5×5 detection window is viewed for detecting halftone areas at lower number of screen lines between about 100 to about 150 lines per inch. In fact, there are pixels in a character image in an original whose density-difference pattern is similar to that of a halftone dot. Therefore, character pixels may be detected as halftone-dot pixels in either with the detection windows of 5×5 and 7×7. However, it is possible to determine whether the detected halftone-dot pixels are the true halftone-dot pixels or character pixels that look like halftone-dot pixels by viewing arrangement of the halftone dot-pixels in a patch larger than the detection window patch. Namely, determinations can be performed based on the characteristic of the true halftone-dot pixels that are present in high density and line up regularly in a predetermined patch.

The halftone-area detection unit 224d detects a halftone area candidate with reference to the regularity of arrangement of the halftone-dot pixels, the degree of concentration of the halftone-dot pixels, and the like based on the rearranged halftone-dot pixel detection result, and outputs a binary signal ami. Based on the binary signal ami, the halftone determination unit 224e outputs a halftone dot detection signal ht as a final halftone separation result.

Figure 6:
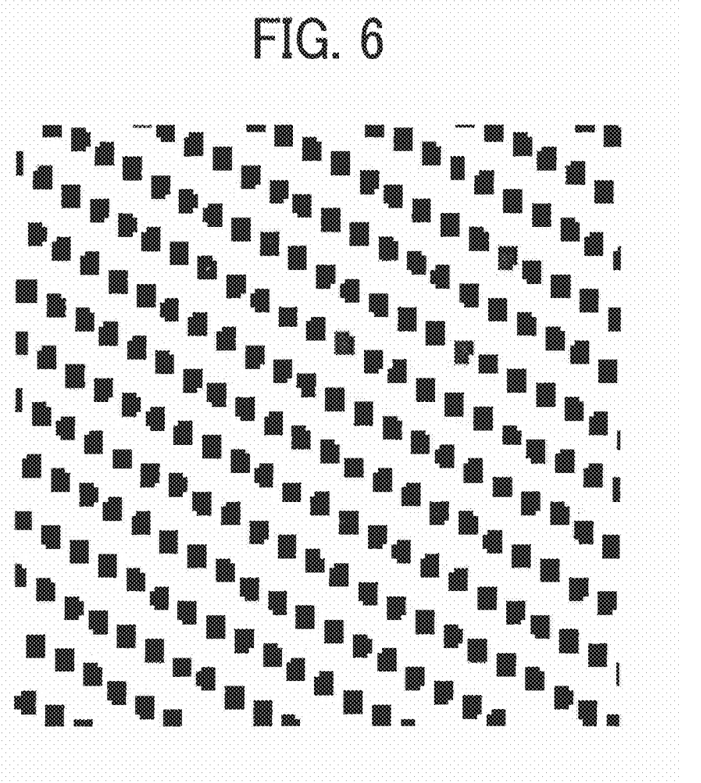
FIG. 6 is a schematic diagram illustrating a result of detection of pixels of a halftone-dot belonging to a cyan halftone area that has a line density of 100 lines per inch.
Figure 7:
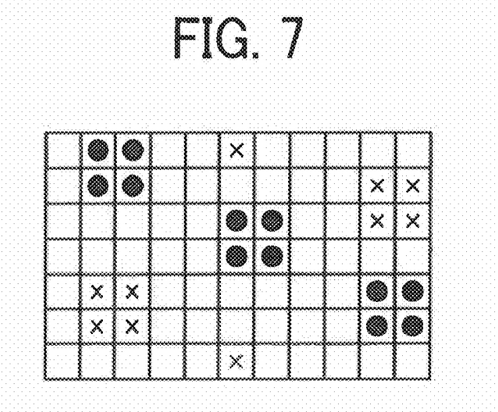
FIG. 7 is a schematic diagram of a conventional halftone determination pattern.

FIG. 6 is a schematic diagram illustrating a result of detection of halftone-dot pixels of a cyan halftone area that contains 100 lines per inch, and FIG. 7 is a schematic diagram of a conventional halftone determination pattern. When the target pixels are detected as halftone-dot pixels by one of the detection windows of 7×7, 5×5, and 3×3, they are displayed as active pixels (solid pixels in FIG. 6). In such a detection way, halftone-dot pixels at various screen lines are detected. There is a low probability that the halftone-dot pixels are lining up in high density in a character image. Therefore, conventionally, the halftone dot-pixel detection result for the target pixel is used for a reference signal to detect a halftone area, and pattern matching is performed by using the pattern shown in FIG. 6 based on the halftone-dot pixel detection result to detect a halftone area.

The larger the two dimensional patch is used to view for pattern matching, the lower the probability of an error determination becomes. However, viewing a large patch in a sub scanning direction needs a high memory capacity to temporarily store image data and halftone-dot pixel detection results, which may cause increased costs. To address this issue, by viewing 15 pixels in a main scanning direction and 7 lines in a sub scanning direction and by using the halftone determination pattern as shown in FIG. 7, it is determined whether the target pixels are in the halftone area depending upon whether the pixels detected by the first halftone-dot pixel detection unit 224a or the second halftone-dot pixel detection unit 224b match the halftone pattern shown in FIG. 7. In FIG. 7, a solid circle represents an active pixel, a x-mark represents a non-active pixel, and an empty cell means a non-defined pixel as an active pixel or a non-active pixel.

Complicated small characters, such as kanji characters, in digital image data can have areas where density-difference pattern are partially similar to that of a reference halftone pattern. With the conventional technique, pixels in such an area are often erroneously detected as belonging to a halftone dot, so that such pixels cannot be accurately distinguished from pixels of a halftone dot.

To address this error determination, the halftone-dot pixel rearranging unit 224c is provided in the present embodiment. The halftone-dot pixel rearranging unit 224c generates a rearrangement signal in which the halftone-dot pixel detection result as shown in FIG. 6 is rearranged near the target pixels, and then generates a synthesized signal in which the rearrangement signal is synthesized with the halftone-dot pixel detection result. The synthesized signal is used as a reference signal to detect a halftone area. Pattern matching is performed using the reference signal and a halftone determination pattern that is different from the pattern shown in FIG. 7, thereby detecting a halftone area.

In other words, the halftone-dot pixel rearranging unit 224c generates a rearrangement signal in which the binary signals gpk1 and gpk2 as halftone-dot pixel detection results are rearranged near the target pixels, and generates a synthesized signal in which the rearrangement signal is synthesized with the halftone-dot pixel detection result signal. Specifically, the halftone-dot pixel rearranging unit 224c generates a rearrangement signal by generating pixels that are delayed from those of the halftone-dot pixel detection result as shown in FIG. 6 by a predetermined number of pixels, and then generates a synthesized signal by calculating a logical sum of each pixel of the halftone-dot pixel detection result and the rearrangement signal of each pixel. With this rearrangement, it is possible to create a pattern that may be present only in a true halftone image, so that a high-density halftone dot pixel detection signal that hardly appears in a character image will not be output to the halftone-area detection unit 224d. The present embodiment employs, for example, a case in which only the halftone-dot pixels detected by the 7×7 detection window are rearranged by delaying by two pixels relative to the target pixels in a main scanning direction.

Figure 8:
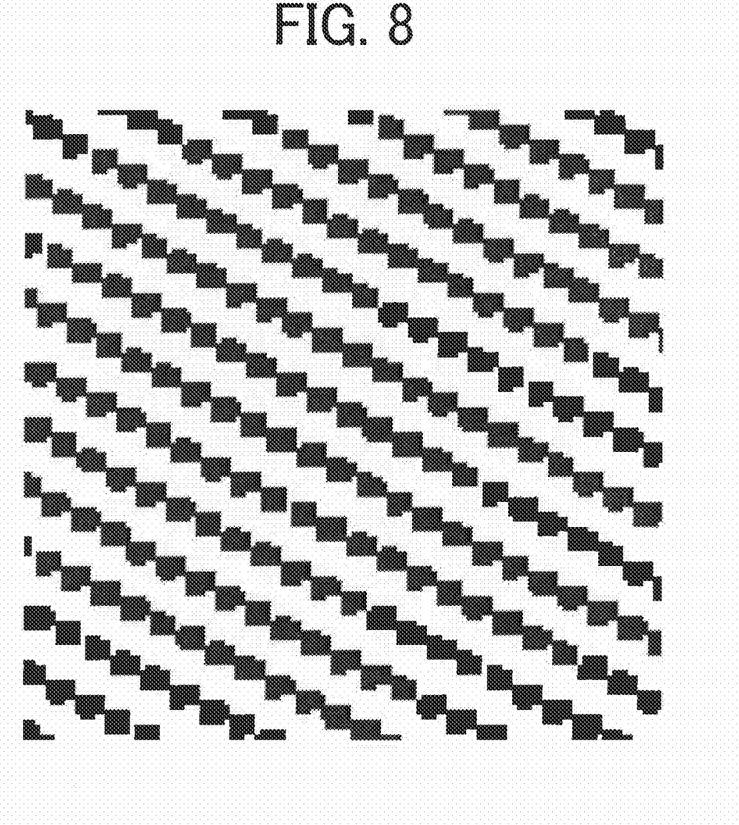
FIG. 8 is a schematic diagram of a pattern obtained by delaying each pixel of the halftone-dot pixel detection result shown in FIG. 6 by two pixels and synthesizing resultant pixels with the halftone-dot pixel detection result.

FIG. 8 is a schematic diagram of a pattern obtained by delaying each pixel of the halftone-dot pixel detection result shown in FIG. 6 by two pixels and synthesizing resultant pixels with the halftone-dot pixel detection result. In other words, the pattern in FIG. 8 is obtained by calculating a logical sum of the halftone-dot pixel detection result by using a plurality of detection windows and the rearrangement signal of the two-pixel-delayed pattern after the halftone-dot pixels have been rearranged. The pattern in FIG. 8 shows higher density and more halftone-dot pixels compared with the pattern in FIG. 6, so that the pattern in FIG. 8 has low probability of being present in a character image. The halftone-dot pixel rearranging unit 224c sends the result of the logical sum calculated after the rearrangement is performed in such a manner to the halftone-area detection unit 224d.

In the halftone-area detection unit 224d, the synthesized signal generated by the halftone-dot pixel rearranging unit 224c is used as a reference signal for detecting a halftone area, and pattern matching is performed by using the reference signal and a halftone determination pattern that is different from the pattern shown in FIG. 7, thereby detecting a halftone area. The halftone-area detection unit 224d outputs a binary signal of ami=1 when the target pixels and all the neighboring pixels match the pattern, otherwise outputs a binary signal of ami=0.

Figure 9:
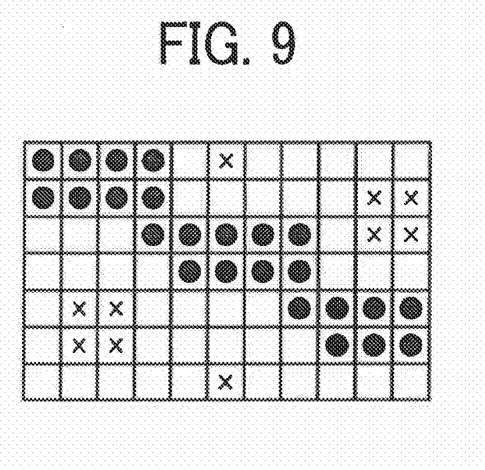
FIG. 9 is a schematic diagram of an exemplary halftone determination pattern according to the first embodiment.

FIG. 9 is a schematic diagram of an exemplary halftone determination pattern that can be employed in the first embodiment. In FIG. 9, a solid circle represents an active pixel, a x-mark represents a non-active pixel, and an empty cell means a non-defined pixel as an active pixel or a non-active pixel. The target pixels are the center pixels. This pattern enables to differentiate pixels that may be included in a character image from pixels in the true halftone image. If the character image is clearly differentiated from the halftone image in the previous rearranging process by the halftone-dot pixel rearranging unit 224c, a pattern easily matching only a halftone image can be generated with ease as a pattern used in the halftone-area detection unit 224d.

As described above, the present embodiment relates to a case in which only the halftone-dot pixels detected by the 7×7 detection window are rearranged by delaying by two pixels relative to the target pixels in a main scanning direction. Alternatively, the rearrangement can be performed in a sub scanning direction. However, rearrangement in the main scanning direction is preferable because rearrangement in the main scanning direction requires smaller memory capacity.

It is explained above that the halftone-area detection unit 224d employs pattern matching for determining for a halftone area. However, the pattern matching is not mandatory. The halftone-area detection unit 224d can be configured to, for example, count the number of halftone-dot pixels in a predetermined small patch that are rearranged after having been input by the halftone-area detection unit 224d. When the counted value is equal to or greater than a predetermined threshold, the halftone-area detection unit 224d determines the neighboring pixels of the target pixels as a halftone area and output a binary signal of ami=1. When the counted value is less than the threshold, the halftone-area detection unit 224d outputs a binary signal of ami=0. If the halftone-area detection unit 224d is configured as mentioned above, because the number of the pixels in a character image differs from that in a halftone image in the halftone-dot pixel rearranging unit 224c, setting the threshold can be facilitated.

The binary signal ami as the result of the detection in the halftone-area detection unit 224d is input into the halftone determination unit 224e from which a halftone detection signal is output based on the input binary signal ami. The halftone determination unit 224e counts the number of pixels having the binary signal of ami=1 in the target small patch of a predetermined size. If the total AmiP of the number of the counted pixels is greater than a predetermined threshold Amith, the halftone determination unit 224e makes a final determination that the target small patch is separable as a halftone area, and outputs the halftone detection signal of ht=1. Otherwise, the determination results in a non-halftone area, and the halftone detection signal of ht=0 is output. The threshold Amith is a parameter that is variable depending on the information on the characteristics near the target small patch, i.e., the result signal ht output from the halftone determination unit 224e for a patch (a processed patch) that is processed before the target small patch.

In the present embodiment, two thresholds TH1 and TH2 (TH1>TH2) are provided for the threshold Amith, one of which is selected in accordance with the halftone dot detection signal ht for the processed patch. If a majority of the neighboring processed patches are determined as non-halftone areas (ht=0), the target small patch has high probability of being a non-halftone area, so that the stricter threshold TH1 is selected to prevent erroneous detection. By contrast, if the majority of the neighboring processed patches are determined as halftone areas (ht=1), the target small patch has high probability of being a halftone area, so that the milder threshold TH2 is selected. When initial image data is input into the halftone determination unit 224e, a pixel that is determined as ht=1 is not present. Therefore, as the initial value for the threshold Amith, the threshold TH1 is selected, and the total AmiP of the number of the pixels having the binary signal of ami=1 in the predetermined target small patch is compared with the threshold TH1.

Figure 10:
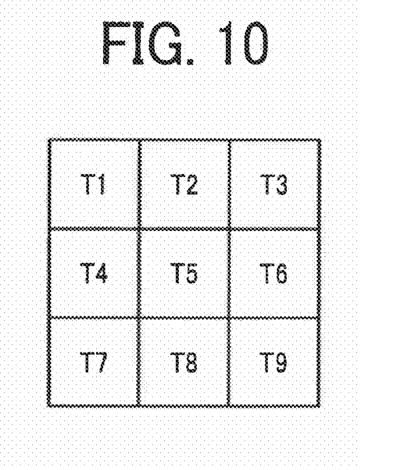
FIG. 10 is a schematic diagram for explaining distribution of a target small area and neighboring processed areas.

FIG. 10 is a schematic diagram for explaining distribution of a target small patch T5 and neighboring processed patches T1, T2, T3, and T4. The threshold selection can be performed, for example, in the following manner. When all the neighboring processed patches T1, T2, T3, and T4 are determined as ht=1 for the threshold Amith, the threshold TH2 (e.g., TH2=4) is selected to determine whether the target small patch T5 is a halftone area. When any one of the neighboring processed patches T1, T2, T3, and T4 is determined as ht=0, the threshold TH1 (e.g., TH1=7) is selected. Alternatively, the threshold TH2 can be selected when any one of the neighboring processed patches T1, T2, T3, and T4 is determined as a halftone area, and the threshold TH1 can be selected only when all the neighboring processed areas T1, T2, T3, and T4 are determined as non-halftone areas. Furthermore, it is possible to view only the neighboring processed patch T1 or T2 for selecting the threshold. The halftone dot detection signal ht by the halftone determination unit 224e is output as the final halftone dot separation result signal ht from the halftone separation unit 224. The halftone determination unit 224e performs an overall determination based on the above results of the determination. The processing details of the halftone determination unit 224e are, although not limited, similar to those by the determination unit in paragraph of 0206 of Japanese Patent Application Laid-open No. 2003-46772.

According to the copier 10, it is possible to generate a pattern having little probability of being present in a character image. Thus, erroneous determination for differentiating between characters and halftone dots can be reduced.

Figure 11:
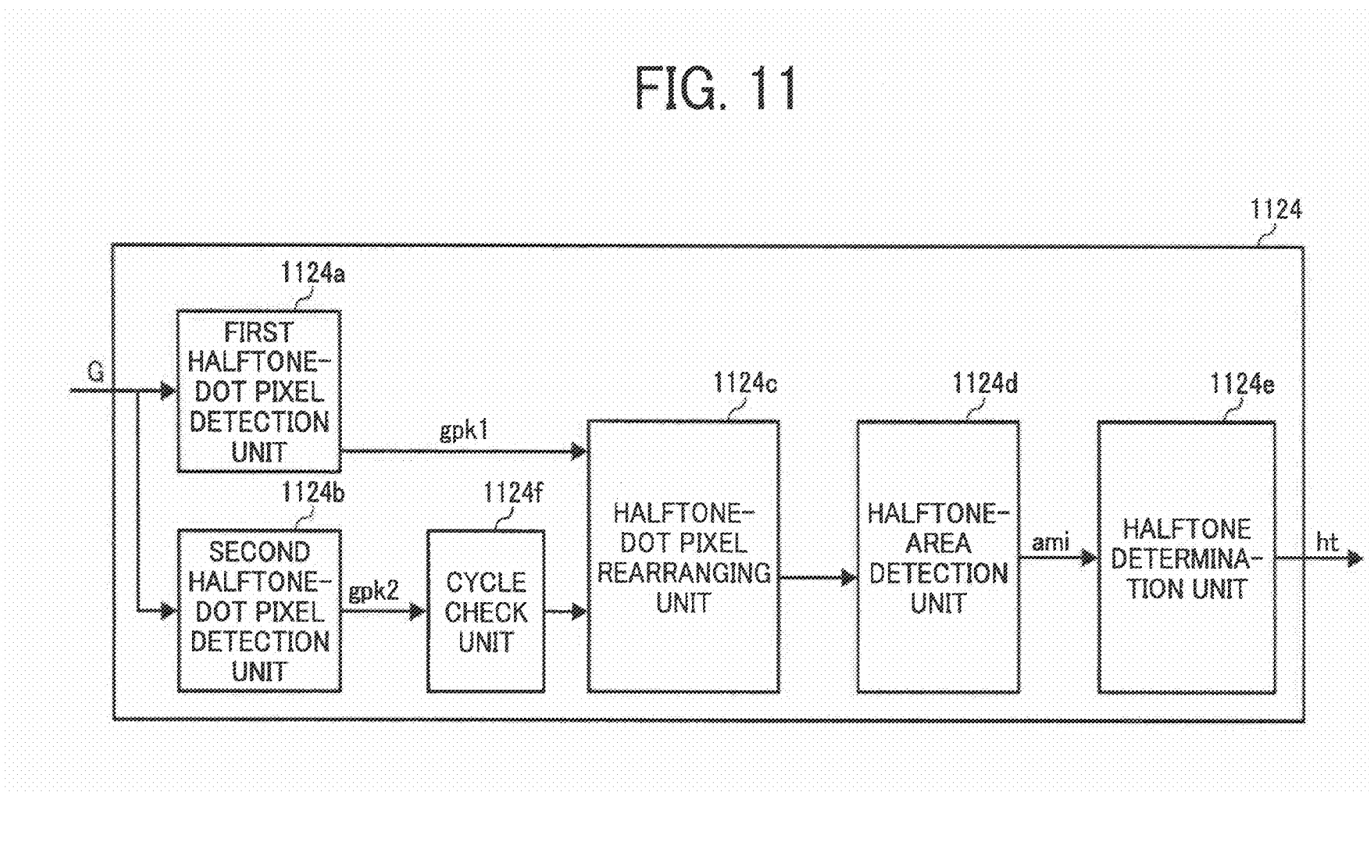
FIG. 11 is a detailed block diagram of a halftone separation unit according to a second embodiment of the present invention.

In the first embodiment, in the halftone separation unit 224, the binary signal gpk2 output from the second halftone-dot pixel detection unit 224b is sent to the halftone-dot pixel rearranging unit 224c. In a second embodiment, a cycle check unit 1124f (a halftone dot pixel nullifying unit) is provided. The cycle check unit 1124f performs a cycle check on the binary signal gpk2 output from a second halftone-dot pixel detection unit 1124b by detecting cycles of a peak pixel having a high density on its center portion and a valley pixel having a low density by comparing with the density of the neighboring halftone-dot pixels. Based upon the results of the cycle check, the halftone-dot pixel detection result part of which has been nullified is input into the halftone-dot pixel rearranging unit 1124c after the cycle check results of the peak pixels and the valley pixels have been logically summed.

FIG. 11 is a detailed block diagram of a halftone separation unit 1124 according to the second embodiment of the present invention. The halftone separation unit 1124 can be used in the image-area separation unit 220 shown in FIG. 4 instead of the halftone separation unit 224. The halftone separation unit 1124 includes a first halftone-dot pixel detection unit 1124a, a second halftone-dot pixel detection unit 1124b, a halftone-dot pixel rearranging unit 1124c, a halftone-area detection unit 1124d, a halftone determination unit 1124e, and the cycle check unit 1124f that is the only different function from the halftone separation unit 224 in the first embodiment.

The cycle check unit 1124f performs the cycle check on the halftone-dot pixel detection result output from the second halftone-dot pixel detection unit 1124b for halftone pixel cycles. Specifically, an interval between halftone-dot pixels in a one-dimensional main scanning direction is checked. This cycle check is performed separately for a peak pixel cycle having a high density on its center portion and for a valley pixel cycle having a low density by comparing with the density of the neighboring halftone-dot pixels.

The halftone dots as targets for detection by the second halftone-dot pixel detection unit 1124b appear equal to or less than at 100 lines per inch in the present embodiment. Any halftone-dot pixels that are present at more than 100 lines per inch (shorter cycle) are not intended to be detected, and those are the pixels that belong to a small character in most cases. For example, when reading image data at 600 dots per inch on the condition of the detecting number of lines being equal to or less than 100 lines per inch, the number of intervals for the peak pixels (or valley pixels) of the true halftone dots is equal to or greater than eight. As a result, peak pixels at less than eight intervals can be regarded as not belonging to the true halftone dots, which therefore can be removed. When the detecting number of lines by the second halftone-dot pixel detection unit 1124b is equal to or less than 100 lines per inch, the threshold for a cycle check can be calculated as follows.

When reading image data at 600 dots per inch on the condition of 100 lines per inch and a screen angle of 0 degree, the cycle is six. Such low screen line halftone dots are used in black-and-white image data in most cases, so that only the black-and-white halftone dots are studied herein. In general, the black-and-white halftone dots have a screen angle of 45 degrees. A cycle for the black-and-white halftone dots is multiplied by 1.41. Thus, the cycle is to be 8.46. The cycle that is equal to or less than eight means that the halftone dots are at more than 100 lines per inch. As a result, the input data is output as a null value. The value of eight for the cycle has been selected for the above reading condition, however the value can be changed as appropriate depending on the design condition.

When the tone values are about 50%, peak pixels and valley pixels alternatively appear, so that accurate cycles do not appear. Therefore, the cycle check unit 1124f performs a cycle detection check for peak pixels and valley pixels separately. Based upon the cycle detection check results, the halftone-dot pixel detection result part of which has been nullified is input into the halftone-dot pixel rearranging unit 1124c after the cycle check results of the peak pixels and the valley pixels have been logically summed.

The halftone-dot pixel rearranging unit 1124c receives the first halftone detection result in the same manner as the first embodiment, and receives the second halftone detection result that only contains halftone dots at desirable low number of screen lines, eliminating the other halftone dots.

According to the copier of the second embodiment, only true halftone dots to be targets at the halftone-area detection unit 1124d can be detected by eliminating the dots belonging to characters. Thus, erroneous determination for differentiating between character images and halftone can be reduced.

An image processing program used for the image processing apparatus according to the present embodiments can be stored in a computer on a network such as the Internet, so that the image processing program can be downloaded via the network. Furthermore, the image processing program can be provided and distributed through a network, or can be incorporated into a readable medium such as a read only memory (ROM).

The image processing program according to the present embodiments has a module configuration that includes the scanner correction unit 200, the compression processing unit 300, the controller 400, the expansion processing unit 800, and the printer correction unit 900. As actual hardware, a central processing unit (CPU) (not shown) reads out the image processing program from a computer-readable recording medium for execution to load each of the above units onto a main storage unit, so that the above units are generated on the main storage device.

According to an aspect of the present invention, a pattern that is hardly present in character images can be created, so that erroneous determinations between character images and halftone can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a receiving unit that receives image data;
   a halftone-dot pixel detection unit that, for each pixel in the image data, detects halftone-dot pixels of a halftone dot as a halftone dot detection result by comparing a density difference between a target pixel and a neighboring pixel group with a predetermined threshold;
   a halftone-dot pixel rearranging unit that rearranges the halftone dot detection result near the target pixel; and
   a halftone-area detection unit that detects a halftone area based on the halftone dot detection result rearranged by the halftone-dot pixel rearranging unit.

2. The image processing apparatus according to claim 1, wherein
   the halftone-dot pixel rearranging unit generates a rearranged image by moving at least one of halftone dot detection results by a predetermined number of pixels relative to the target pixel, and generates a synthesized image by calculating a logical sum of each pixel of the rearranged image and each of the halftone-dot pixels, and
   the halftone-area detection unit detects the halftone area based on the synthesized image.

3. The image processing apparatus according to claim 2, wherein the halftone-dot pixel rearranging unit moves the halftone-dot pixels relative to the target pixel in a main scanning direction.

4. The image processing apparatus according to claim 1, further comprising a halftone dot pixel nullifying unit that compares an interval of halftone-dot pixels in a one-dimensional main scanning direction with a predetermined threshold and nullifies the halftone-dot pixels when the interval is smaller than the threshold, wherein the halftone-dot pixel rearranging unit rearranges the halftone dot detection result, from which the halftone-dot pixels having an interval smaller than the threshold are nullified, near the target pixel, and the halftone dot pixel nullifying unit nullifies only one of halftone dot detection results that have a relative distance at a screen angle of non-zero degrees.

5. The image processing apparatus according to claim 4, wherein the halftone dot pixel nullifying unit nullifies halftone-dot pixels that appear at a cycle shorter than number of screen lines to which the threshold is preset.

6. The image processing apparatus according to claim 4, wherein the halftone dot pixel nullifying unit nullifies halftone-dot pixels that appear at number of screen lines higher than a predetermined threshold.

7. The image processing apparatus according to claim 1, wherein the halftone-dot pixel detection unit compares a density difference between the target pixel and the neighboring pixels by referring to a pixel density information in a two-dimensional local area of a predetermined size using the image data, and detects the target pixel as an halftone area when determining that the density difference is greater than a predetermined threshold.

8. An image forming apparatus comprising the image processing apparatus according to claim 1 and an image forming device that forms an image based on image data in which halftone pixel areas are detected by the image processing apparatus and prints the image onto a paper.

9. An image processing method performed by an image processing apparatus, comprising:

receiving image data;

detecting, for each pixel in the image data, halftone-dot pixels of a halftone dot as a halftone dot detection result by comparing a density difference between a target pixel and a neighboring pixel group with a predetermined threshold;

rearranging the halftone dot detection result near the target pixel; and detecting a halftone area based on the halftone dot detection result rearranged at the rearranging.

10. A computer program product that includes a computer program stored on a non-transitory computer-readable recording medium which when executed on a computer causes the computer to execute:

receiving image data;

detecting, for each pixel in the image data, halftone-dot pixels of a halftone dot as a halftone dot detection result by comparing a density difference between a target pixel and a neighboring pixel group with a predetermined threshold;

rearranging the halftone dot detection result near the target pixel; and detecting a halftone area based on the halftone dot detection result rearranged at the rearranging.

* * * * *